US009287644B2

(12) United States Patent
Gao et al.

(10) Patent No.: US 9,287,644 B2
(45) Date of Patent: Mar. 15, 2016

(54) BRIDGE STRUCTURE IN CONDUCTIVE MESH AND METHOD FOR MANUFACTURING THE SAME

(71) Applicant: NANCHANG O-FILM TECH. CO., LTD., Jiangxi (CN)

(72) Inventors: Yulong Gao, Jiangxi (CN); Fei Zhou, Jiangxi (CN)

(73) Assignee: Nanchang O-Film Tech Co., Ltd., Jiangxi (CN)

( * ) Notice: Subject to any disclaimer, the term of this patent is extended or adjusted under 35 U.S.C. 154(b) by 5 days.

(21) Appl. No.: 13/968,823

(22) Filed: Aug. 16, 2013

(65) Prior Publication Data
US 2014/0251674 A1    Sep. 11, 2014

Related U.S. Application Data

(63) Continuation of application No. PCT/CN2013/078944, filed on Jul. 6, 2013.

(30) Foreign Application Priority Data

Mar. 6, 2013   (CN) .......................... 2013 1 0071856

(51) Int. Cl.
H01R 12/79 (2011.01)
H01R 43/00 (2006.01)
G06F 3/044 (2006.01)

(52) U.S. Cl.
CPC ................ H01R 12/79 (2013.01); G06F 3/044 (2013.01); H01R 43/00 (2013.01); G06F 2203/04111 (2013.01)

(58) Field of Classification Search
CPC ........................................... G06F 2203/04111
USPC ........................................................ 174/261
See application file for complete search history.

(56) References Cited

U.S. PATENT DOCUMENTS

2009/0002337 A1   1/2009 Chang
2012/0081333 A1*  4/2012 Ozeki et al. ................... 345/174
(Continued)

FOREIGN PATENT DOCUMENTS

CN   202150102 U   2/2012
CN   102446047 A   5/2012
(Continued)

OTHER PUBLICATIONS

Communication From The Chinese Patent Office Regarding a Counterpart Foreign Application Dated Jan. 9, 2014.
(Continued)

Primary Examiner — Hoa C Nguyen
Assistant Examiner — Amol Patel
(74) Attorney, Agent, or Firm — Rosenberg, Klein & Lee

(57) ABSTRACT

A bridge structure for electrically connecting to a second direction meshed conductive trace disposed on a substrate surface, where a first direction meshed conductive trace disposed on the same surface, which includes a first bridging wire, a second bridging wire, an insulating layer, and a conductive bridge. The first bridging wire and the second bridging wire are disposed on the second direction meshed conductive trace, and the first bridging wire and the second bridging wire are connected via the conductive bridge, thereby connecting to the second direction meshed conductive trace. when the conductive bridge is directly connected to the second direction meshed conductive trace, the risk of the conductive bridge being connected to blank area between the meshed conductive lines is avoided, when the bridge structure is applied to the touch screen, the thickness of the touch screen and the cost are reduced and the production efficiency is improved.

11 Claims, 3 Drawing Sheets

(56) References Cited

U.S. PATENT DOCUMENTS

2012/0118614 A1* 5/2012 Kuriki .................... 174/250
2012/0182250 A1* 7/2012 Nagata et al. ............. 345/173
2012/0319990 A1* 12/2012 Chan et al. ............... 345/174

FOREIGN PATENT DOCUMENTS

| CN | 102681734 A | 9/2012 |
| CN | 102830867 A | 12/2012 |
| CN | 202735635 U | 2/2013 |
| JP | 2006-344163 A | 12/2006 |
| JP | 2009-9574 A | 1/2009 |
| JP | 2012-79134 A | 4/2012 |
| TW | 201250559 A | 12/2012 |
| WO | 2011/081112 A1 | 7/2011 |

OTHER PUBLICATIONS

Communication from The Patent Office of Korea Regarding a Counterpart Foreign Application Dated Mar. 19, 2015.
Communication From The Patent Office of Japan Regarding a Counterpart Foreign Application Dated (Emperor Year 27) Mar. 20, 2015.
Communication From The Patent Office of Taiwan Regarding a Counterpart Foreign Application Dated (Taiwan Year 104) Feb. 26, 2015.

* cited by examiner

BRIDGE STRUCTURE IN CONDUCTIVE MESH AND METHOD FOR MANUFACTURING THE SAME

FIELD OF THE INVENTION

The present disclosure relates to a bridge structure in a conductive mesh and a method for manufacturing the bridge structure.

BACKGROUND OF THE INVENTION

The conductive pattern of the capacitive touch screen includes two groups of parallel conductive metal meshed traces consisting of conductive wires. Conventionally, one group of parallel metal meshed traces are arranged along a X axis in a two-dimensional coordinates, while the other group of parallel metal meshed traces are arranged along a Y-axis in the two-dimensional coordinates. Two groups of the metal meshed traces are located on two different substrates bonded together in alignment. When the conductive structure is applied to the touch screen, the touch screen has a disadvantage of large thickness.

SUMMARY OF THE INVENTION

To address the problem of large thickness of the touch screen, the present disclosure is directed to a bridge structure in a conductive mesh and a method for manufacturing the bridge structure for reducing the thickness of the touch screen.

According to an aspect of the present disclosure, a bridge structure in a conductive mesh is provided, to be electrically connected to a second direction meshed conductive trace disposed on a surface of a substrate, a first direction meshed conductive trace is disposed on the same surface of the substrate, the first direction meshed conductive trace and the second direction meshed conductive trace are not parallel to each other, the second direction meshed conductive trace is broken at crossing with the first direction meshed conductive trace to form an interrupting portion, such that the second direction meshed conductive trace is not connected to the first direction meshed conductive trace, the bridge structure includes:

a first bridging wire and a second bridging wire respectively located at opposite ends of the interrupting portion of the second direction meshed conductive trace and located at two sides of the first direction meshed conductive trace arranged in the interrupting portion, respectively;

an insulating layer disposed on the first direction meshed conductive trace; and a conductive bridge disposed on the insulating layer, insulated to the first direction meshed conductive trace, and connected to the first bridging wire and the second bridging wire.

In one embodiment, both a width of the first bridging wire and a width of the second bridging wire range from 1 μm to 10 μm.

In one embodiment, the conductive bridge is a metal powder layer conductive bridge, a width of the metal powder layer conductive bridge ranges from 10 μm to 20 μm.

In one embodiment, an upper surface of the insulating layer is a smooth curved surface.

In one embodiment, the insulating layer is a parabolic-like insulating layer.

In embodiment, the insulating layer is a transparent insulating paint layer.

According to an aspect of the present disclosure, a method of manufacturing a bridge structure is provided, the bridge structure is to be electrically connected to a second direction meshed conductive trace disposed on a surface of a substrate, on which the first direction meshed conductive trace is disposed, the method includes the following steps:

forming a first bridging wire and a second bridging wire at opposite ends of an interrupting portion of the second direction meshed conductive trace, and arranged at two sides of the first direction meshed conductive trace arranged in the interrupting portion, respectively;

laying an insulating layer on the first direction meshed conductive trace; and laying a conductive bridge on the insulating layer to be insulated to the first direction meshed conductive trace and connected to the first bridging wire and the second bridging wire.

In one embodiment, the first direction meshed conductive trace and the second direction meshed conductive trace are arranged at a same surface of a substrate;

the first direction meshed conductive trace and the second direction meshed conductive trace are not parallel to each other, the second direction meshed conductive trace is broken at crossing with the first direction meshed conductive trace, such that the second direction meshed conductive trace is not connected to the first direction meshed conductive trace.

In one embodiment, the method includes laying the first bridging wire, the second bridging wire, the first direction meshed conductive trace, and the second direction meshed conductive trace on the substrate at the same time.

In one embodiment, the conductive bridge is a metal powder layer conductive bridge, the laying the conductive bridge on the insulating layer to be insulated to the first direction meshed conductive trace is carried out through inkjet-printing metal powders on the insulating layer.

In one embodiment, the insulating layer is a transparent insulating paint layer, the laying the insulating layer on the first meshed conductive trace is carried out through inkjet-printing a transparent insulating paint on the first direction meshed conductive trace.

In the conductive meshed bridge structure and the method for manufacturing the conductive meshed bridge structure, the first direction meshed conductive trace and the second direction meshed conductive trace are disposed on the same substrate. In order to prevent the first direction meshed conductive trace from being connected to the second direction meshed conductive trace at the intersection, the second direction meshed conductive trace is broken at crossing with the first direction meshed conductive trace, such that the second direction meshed conductive trace are divided into two discontinued meshed conductive trace. The first bridging wire and the second bridging wire are disposed on the second direction meshed conductive trace, and the first bridging wire is connected to the second bridging wire via the conductive bridge, thereby two of the second direction meshed conductive trace located on two sides of the first direction meshed conductive trace are connected. Moreover, the conductive bridge is insulated to the first direction meshed conductive trace via the insulating layer; the first direction meshed conductive trace are not connected to the second direction meshed conductive trace, such that the purpose of the first direction meshed conductive trace and the second direction meshed conductive trace being disposed on the same substrate is achieved. Besides, when the conductive bridge is directly used to connect the disconnected meshed conductive trace, the risk of the conductive bridge being connected to the blank area between the meshed conductive trace is avoided.

Furthermore, when the conductive meshed bridge structure is applied to the touch screen, the thickness of the touch screen and the costs is reduced, and the production efficiency is improved.

DETAILED DESCRIPTION OF THE EMBODIMENTS

Reference will now be made to the drawings to describe, in detail, embodiments of the present bridge structure and the method for manufacturing the bridge structure.

Figure 1:
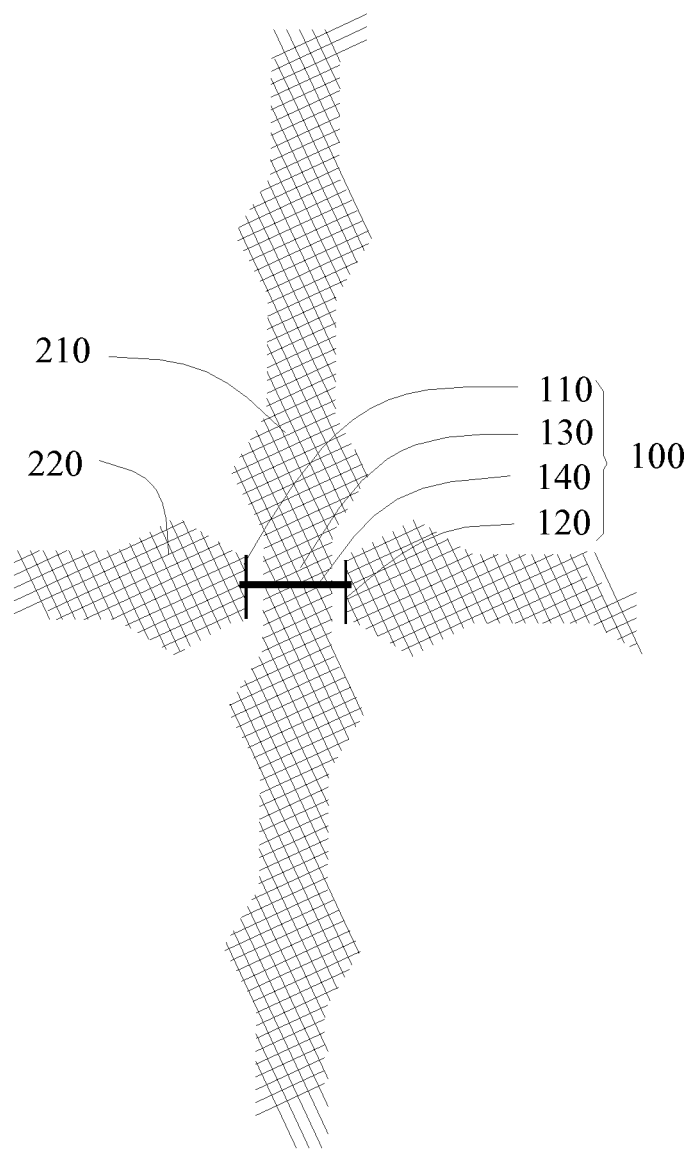
FIG. 1 is a schematic view of a conductive meshed bridge structure.

Referring to FIG. 1, a bridge structure 100 is provided, which is to be electrically connected to a second direction meshed conductive trace 220, a first direction meshed conductive trace 210 is disposed on the same surface of substrate surface. The bridge structure 100 includes a first bridging wire 110, a second bridging wire 120, an insulating layer 130, and a conductive bridge 140.

Specifically, the substrate is made of a transparent material, such as glass, polyethylene terephthalate (PET), polycarbonate (PC) or polymethylmethacrylate (PMMA), and so on.

The first direction meshed conductive trace 210 and the second direction meshed conductive trace 220 are not parallel to each other, and the second direction meshed conductive trace 220 is broken at crossing with the first direction meshed conductive trace 210 to form an interrupting portion, i.e. the second direction meshed conductive trace 220 is divided to two discontinued meshed conductive trace, and the second direction meshed conductive trace 220 is not connected to the first direction meshed conductive trace 210. The first direction meshed conductive trace 210 and the second direction meshed conductive trace 220 can be made of silver, copper, a composition of silver and copper, or nickel, and the like.

In the illustrated embodiment, the first direction is a vertical direction; the second direction is a horizontal direction. In alternative embodiments, the first direction can be the horizontal direction; the second direction can be the vertical direction. Besides, the first direction can be not perpendicular to the second direction, as long as they are not parallel to each other.

Both the first bridging wire 110 and the second bridging wire 120 are disposed on at opposite ends of the interrupting portion of the second direction meshed conductive trace 220, and the first bridging wire 110 and the second bridging wire 120 are disposed on two sides of the first direction meshed conductive trace 210, respectively, i.e. the first bridging wire 110 and the second bridging wire 120 are disposed in the boundary position of an interrupted section of the second direction meshed conductive trace 220. The meshed conductive trace is formed by splicing metal wires, a width of the metal wire ranges from 1 μm to 5 μm, a distance between the metal lines ranges from 300 μm to 500 μm. If the width of the designed bridging wire is too large (for example, up to 150 μm to 500 μm), the obvious bridging wire can be formed on the substrate, thereby affecting the optical performance of the touch screen. Accordingly, the width of the first bridging wire 110 and the second bridging wire 120 usually ranges from 1 μm to 10 μm; which can avoid that the widths of the first bridging wire 110 and the second bridging wire 120 are too great to affect the optical performance of the touch screen.

Both a length of the first bridging wire 110 and the second bridging wire 120 can equal to a sectional length of the interrupted section of the second direction meshed conductive trace 220, or it can be configured according to the practical situation. It is to be understood that, the length of the first bridging wire 110 and the second bridging wire 120 is several or dozens of times to the distance of between the metal trace, accordingly, when the conductive bridge 140 is connected to the disconnected meshed conductive trace 220, the risk of the conductive bridge 140 being connected to the blank area between the metals lines but not the metal lines is avoided. The first bridging wire 110 and the second bridging wire 120 can be made of silver, copper, a composition of silver and copper, or nickel, and the like.

The insulating layer 130 is disposed on the first direction meshed conductive trace 220. The insulating layer 130 is usually disposed on the area consisted by the first bridging wire 110, the second bridging wire 120 and the ends of the first bridging wire 110 and the second bridging wire 120, and located on the first direction meshed conductive trace 210. It is to be understood that, it can be configured in different way according to the practical situation. Accordingly, when the first bridging wire 110 is connected to and the second bridging wire 120 via the conductive bridge 140, the conductive bridge 140 is insulated to the first direction meshed conductive trace 210.

Figure 2:
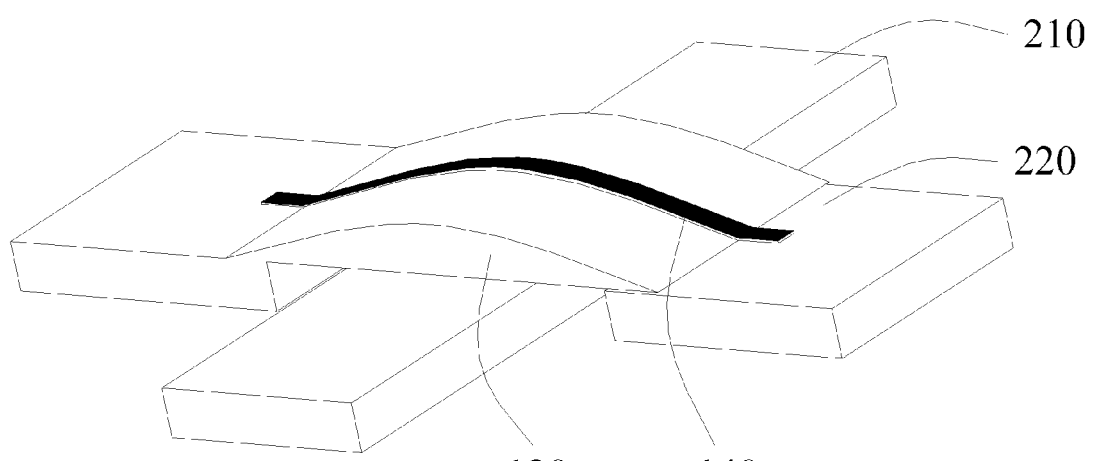
FIG. 2 is a partial, enlarged view of a conductive meshed bridge structure according to an embodiment.

Referring to FIG. 2, an upper surface of the insulating layer 130 can be a smooth transition curved surface, such as a parabolic-like insulating layer 130, the problem of the disconnection of the conductive bridge 140 caused by the height difference between a surface of the insulating layer 130 and the first bridging wire 110 or the second bridging wire 120 can be avoided.

In the illustrated embodiment, the insulating layer 130 is a transparent insulating paint layer, thereby preventing the optical performance of the touch screen from being affected. The transparent insulating paint layer can be formed by ink-jet printing to fix on the first direction meshed conductive trace 210, which is simple and convenient. In alternative embodiments, the insulating layer 130 can be non-transparent, while a width of the insulating layer 130 should be limited to prevent the optical performances of the touch screen from being affected.

The conductive bridge 140 is disposed on the insulating layer 130 to insulate to the first direction meshed conductive trace 210, and the first bridging wire 110 is connected to the second bridging wire 120 via the conductive bridge 140.

A width of the conductive bridge 140 can be configured to range from 10 μm to 20 μm. Accordingly, it is not only more convenient to connect the conductive bridge 140 to the first bridging wire 110 and the second bridging wire 120, the influence on the optical performance of the touch screen caused by the too large width of a conductive bridge 140 can also be avoided.

The conductive bridge 140 can be a wire or a metal powder layer. In the illustrated embodiment, the conductive bridge 140 is a metal powder layer conductive bridge, and it is also can be formed by ink-jet printing to fix on the insulating layer 130, which is simple and convenient. Then, the conductive bridge 140 can be connected to the first bridging wire 110 and the second bridging wire 120 via laser-aligned to improve the connection speed and accuracy. The conductive bridge 140 can be made of silver, copper, a composition of silver and copper, or nickel and the like.

In the bridge structure 100, the first direction meshed conductive trace 210 and the second direction meshed conductive trace 220 are disposed on the same substrate, the second direction meshed conductive trace 220 is broken at crossing with the first direction meshed conductive trace 210 to prevent the first direction meshed conductive trace 210 from being connected the second direction meshed conductive trace 220 at the intersection, and the second direction meshed conductive trace 220 are divided into two discontinued meshed conductive trace. Since the first bridging wire 110 and the second bridging wire 120 are disposed on the second direction meshed conductive trace 220, and the first bridging wire 110 is connected to the second bridging wire 120 via the conductive bridge 140, thereby two of the second direction meshed conductive trace 220 located on two sides of the first direction meshed conductive trace 210 are connected. Moreover, the conductive bridge 140 is insulated to the first direction meshed conductive trace 210 via the insulating layer 130; the first direction meshed conductive trace 210 are not connected to the second direction meshed conductive trace 220, such that the purpose of the first direction meshed conductive trace 210 and the second direction meshed conductive trace 220 being disposed on the same substrate is achieved. Besides, when the conductive bridge 140 is directly used to connect to the disconnected second direction meshed conductive trace 220, the risk of the conductive bridge 140 is connected to the blank area between the meshed conductive trace is avoided. Furthermore, when the bridge structure 100 is applied to the touch screen, the thickness of the touch screen and the costs are reduced, and the production efficiency is improved.

Figure 3:
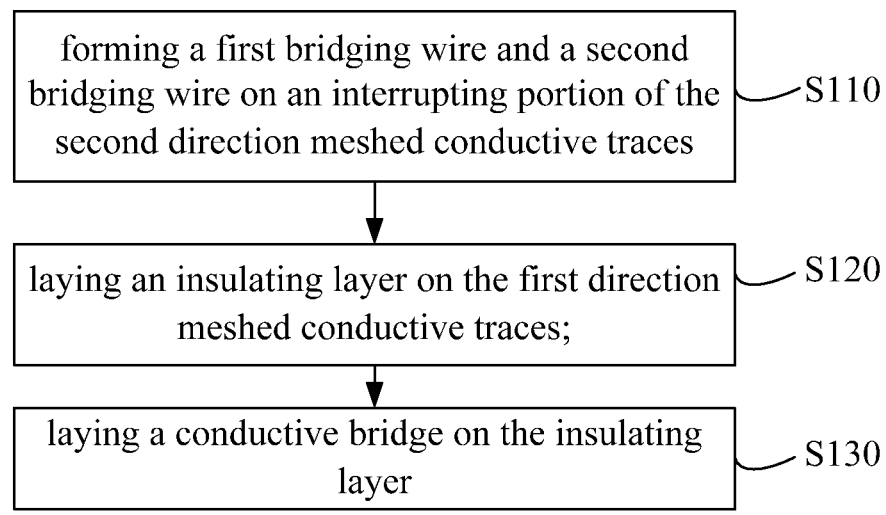
FIG. 3 is a flowchart of a method for manufacturing the conductive meshed bridge structure.

Referring to FIG. 3, a method for manufacturing the bridge structure 100 for connecting the first direction meshed conductive trace 210 and the second direction meshed conductive trace 220 disposed on the same substrate is also provided, which includes the following steps:

Step S110: the first bridging wire 110 and the second bridging wire 120 are laid on an interrupting portion of the second direction meshed conductive trace 220.

The first bridging wire 110 and the second bridging wire 120 are laid in the boundary position of an interrupting section of the second direction meshed conductive trace 220, and disposed on two sides of the first direction meshed conductive trace 210, respectively. The first bridging wire 110 and the second bridging wire 120 can be made of silver, copper, a composition of silver and copper, or nickel, and the like.

Specifically, both the length of the first bridging wire 110 and the second bridging wire 120 can be configured to equal to the sectional length of the interrupting section of the second direction meshed conductive trace 220. It is to be understood that, it can be configured according to the practical situation. It is to be understood that, the length of the first bridging wire 110 and the second bridging wire 120 is several or dozens of times to the distance of between the metal lines, therefore, when the conductive bridge 140 is connected to the disconnected meshed conductive trace 220, the risk of the conductive bridge 140 being connected to the blank area between the metal lines but not the metal lines is avoided.

Step S120: the insulating layer 130 is laid on the first direction meshed conductive trace 210.

The principle of laying the insulating layer 130 is: when the conductive bridge 140 is laid, it is convenient for the conductive bridge 140 and first direction meshed conductive trace 210 being insulated connected to the first bridging wire 110 and the second bridging wire 120. Accordingly, the insulating layer 130 is usually disposed on the area consisted by the first bridging wire 110, the second bridging wire 120 and the ends of the first bridging wire 110 and the second bridging wire 120, and located on the first direction meshed conductive trace 210. the insulating layer 130 can be configured as a smooth transition curved insulating layer 130, such as a parabolic-like insulating layer 130, the problem of the disconnection of the conductive bridge 140 caused by the height difference between a surface of the insulating layer 130 and the first bridging wire 110 or the second bridging wire 120 can be avoided.

In the illustrated embodiment, the insulating layer 130 is a transparent insulating paint layer, thereby preventing the optical performance of the touch screen from being affected. The transparent insulating paint layer can be formed by ink-jet printing to fix on the first direction meshed conductive trace 210; which is simple and convenient. In alternative embodiments, the insulating layer 130 can be non-transparent, while a width of the insulating layer 130 is to be limited to prevent the optical performances of the touch screen from being affected.

Step S130: the conductive bridge is laid on the insulating layer 130.

The conductive bridge 140 is insulated to the first direction meshed conductive trace 210; the first bridging wire 110 is connected to the second bridging wire 120 via the conductive bridge 140. The conductive bridge 140 can be made of silver, copper, a composition of silver and copper, or nickel and the like. The conductive bridge 140 can be a wire or a metal powder layer. In the illustrated embodiment, the conductive bridge 140 is a metal powder layer conductive bridge, and it is also formed by ink-jet printing to fix on the insulating layer 130, which is simple and convenient. At this moment, the conductive bridge 140 can be connected to the first bridging wire 110 and the second bridging wire 120 via laser-aligned to improve the connection speed and accuracy.

In the above steps, the width of the first bridging wire 110 and the second bridging wire 120 can be configured to range from 1 μm to 10 μm; the width of the conductive bridge 140 can be configured to range from 10 μm to 20 μm. Accordingly, it is convenient for the conductive bridge 140 to connect to the first bridging wire 110 and the second bridging wire 120, and the influence on the optical performance of the touch screen caused by the too large widths of the first bridging wire 110, the second bridging wire 120 and the conductive bridge can be avoided.

The step of manufacturing the first direction meshed conductive trace 210 and the second direction meshed conductive trace 220 on the same substrate includes: the first direction meshed conductive trace 210 and a second direction meshed conductive trace 220 are laid on the substrate.

The substrate is made of transparent material, such as glass, polyethylene terephthalate (PET), polycarbonate (PC), or polymethylmethacrylate (PMMA), and so on.

The first direction meshed conductive trace 210 and the second direction meshed conductive trace 220 are laid on the same substrate, the first direction meshed conductive trace 210 and the second direction meshed conductive trace 220 are not parallel to each other, the second direction meshed conductive trace 220 is broken at crossing with the first direction meshed conductive trace 210, thereby, the second direction meshed conductive trace 220 is not connected to the first direction meshed conductive trace 210.

The first direction is a vertical direction; the second direction is a horizontal direction. In alternative embodiments, the first direction can be the horizontal direction; the second direction can be the vertical direction. Besides, the first direction can be not perpendicular to the second direction, as long as they are not parallel to each other. The first direction meshed conductive trace 210 and the second direction meshed conductive trace 220 can be made of silver, copper, a composition of silver and copper, or nickel, and the like.

In the practical operation, the first bridging wire 110, the second bridging wire 120, the first direction meshed conductive trace 210 and the second direction meshed conductive trace 220 can be simultaneously formed, i.e. the first bridging wire 110, the second bridging wire 120, the first direction meshed conductive trace 210, and the second direction meshed conductive trace 220 are simultaneously laid on the substrate. Accordingly, the machining processes and costs are reduced.

The first direction meshed conductive trace 210 and the second direction meshed conductive trace 220 are laid on the same substrate, in order to prevent the first direction meshed conductive trace 210 from being connected to the second direction meshed conductive trace 220 in the intersection, thereby when the second direction meshed conductive trace 220 is broken at crossing with the first direction meshed conductive trace 210, and the second direction meshed conductive trace 220 is divided to two discontinued meshed conductive trace. In the method for manufacturing the bridge structure 100, the first bridging wire 110 and the second bridging wire 120 are laid on the second direction meshed conductive trace 220, and the first bridging wire 110 is connected to the second bridging wire 120 via the conductive bridge 140, thereby, two of the second direction meshed conductive trace 220 located on two sides of the first direction meshed conductive trace 210 are connected. Moreover, the conductive bridge 140 is insulated to the first direction meshed conductive trace 210 via the insulating layer 130, such that the first direction meshed conductive trace 210 is not connected to the second direction meshed conductive trace 220, such that the purpose of laying the first direction meshed conductive trace 210 and the second direction meshed conductive trace 220 on the same surface of a substrate is achieved. Besides, when the conductive bridge 140 is directly used to connect to the second direction meshed conductive trace 220, the risk of the conductive bridge 140 is connected to the blank area between the meshed conductive trace is avoided. Furthermore, when the bridge structure 100 is applied to the touch screen, the thickness of the touch screen and the costs are reduced, and the production efficiency is improved.

It should be understood that the descriptions of the examples are specific and detailed, but those descriptions can't be used to limit the present disclosure. Therefore, the scope of protective of the disclosure patent should be subject to the appended claims.

What is claimed is:

1. A bridge structure for electrically connecting meshed conductive traces, comprising:
   a first direction meshed conductive trace disposed on a planar surface of a substrate;
   a second direction meshed conductive trace disposed on said planar surface, the second direction meshed conductive trace having a first portion spaced apart from a second portion, the first and second portions of the second direction meshed conductive trace having respective terminal ends disposed on opposing sides of the first direction meshed conductive trace;
   a first bridging wire and a second bridging wire respectively located at terminal ends of the first and second portions, the first and second bridging wires each extending transversely across respective first and second portions, the first and second bridging wires each having a length being substantially equal to a width of the corresponding terminal ends of the first and second portions, respectively;
   an insulating layer disposed on the first direction meshed conductive trace; and
   a conductive bridge disposed on the insulating layer, insulated to the first direction meshed conductive trace, and connecting the first bridging wire and the second bridging wire, wherein the conductive bridge has opposing end portions extending beyond the first bridging wire and the second bridging wire, respectively, to directly contact the first portion meshed conductive trace and the second portion meshed conductive trace, the combination of the conductive bridge and the first and second bridging wires thereby electrically contacting the first and second portion meshed conductive traces in both a longitudinal and transverse directions.

2. The conductive meshed bridge structure according to claim 1, wherein both a width of the first bridging wire and a width of the second bridging wire range from 1 μm to 10 μm.

3. The conductive meshed bridge structure according to claim 1, wherein the conductive bridge is a metal powder layer conductive bridge, a width of the metal powder layer conductive bridge ranges from 10 μm to 20 μm.

4. The conductive meshed bridge structure according to claim 1, wherein a profile of an upper surface of the insulating layer has a curved contour.

5. The conductive meshed bridge structure according to claim 4, wherein the insulating layer is a parabolic-like insulating layer.

6. The conductive meshed bridge structure according to claim 1, wherein the insulating layer is a transparent insulating paint layer.

7. A method of manufacturing a bridge structure to being electrically connected to a second direction meshed conductive trace disposed on a surface of a substrate, on which a first direction meshed conductive trace is disposed, the method comprising:
   forming a first bridging wire and a second bridging wire at opposite ends of an interrupting portion of the second direction meshed conductive trace, and arranged at two sides of the first direction meshed conductive trace arranged in the interrupting portion, respectively, the first and second bridging wires each having a length being substantially equal to a width of corresponding terminal ends of the second direction meshed conductive trace defining the interrupting portion, the first and second bridging wires each extending transversely across respective corresponding terminal ends of the second direction meshed conductive trace;
   laying an insulating layer on the first direction meshed conductive trace; and
   laying a conductive bridge on the insulating layer to be insulated to the first direction meshed conductive trace and connected to the first bridging wire and the second bridging wire, the layering of the conductive bridge includes positioning opposing end portions to extend beyond the first bridging wire and the second bridging wire, respectively, to directly contact the corresponding terminal ends of the second direction meshed conductive trace, the combination of the conductive bridge and the first and second bridging wires thereby electrically contacting the corresponding terminal ends of the second direction meshed conductive trace in both a longitudinal and transverse directions.

8. The method according to claim 7, wherein the first direction meshed conductive trace and the second direction meshed conductive trace are arranged at a same surface of a substrate;
    the first direction meshed conductive trace and the second direction meshed conductive trace are not parallel to each other, the second direction meshed conductive trace is broken at crossing with the first direction meshed conductive trace, such that the second direction meshed conductive trace is not connected to the first direction meshed conductive trace.

9. The method of according to claim 8, wherein laying the first bridging wire, the second bridging wire, the first direction meshed conductive trace, and the second direction meshed conductive trace on the substrate at the same time.

10. The method according to claim 7, wherein the conductive bridge is a metal powder layer conductive bridge, the laying the conductive bridge on the insulating layer to be insulated to the first direction meshed conductive trace is carried out through inkjet-printing metal powders on the insulating layer.

11. The method according to claim 7, wherein the insulating layer is a transparent insulating paint layer, the laying the insulating layer on the first meshed conductive trace is carried out through inkjet-printing a transparent insulating paint on the first direction meshed conductive trace.

* * * * *